(12) United States Patent
Deshmukh et al.

(10) Patent No.: US 7,789,191 B2
(45) Date of Patent: Sep. 7, 2010

(54) ELECTRIC POWER ASSIST MODULE FOR STEERING SYSTEM

(75) Inventors: Kiran Manohar Deshmukh, New Delhi (IN); Ravindra Nath Sharma, Gurgaon (IN)

(73) Assignee: Sona Koyo Steering Systems Ltd., Gurgaon (IN)

( * ) Notice: Subject to any disclaimer, the term of this patent is extended or adjusted under 35 U.S.C. 154(b) by 287 days.

(21) Appl. No.: 11/801,245

(22) Filed: May 9, 2007

(65) Prior Publication Data

US 2008/0264713 A1 Oct. 30, 2008

(30) Foreign Application Priority Data

Apr. 24, 2007 (IN) ............................ 911/DEL/2007

(51) Int. Cl.
B62D 5/04 (2006.01)
(52) U.S. Cl. ..................................................... 180/444
(58) Field of Classification Search ................. 180/444, 180/443
See application file for complete search history.

(56) References Cited

U.S. PATENT DOCUMENTS

| | | | | |
|---|---|---|---|---|
| 2,634,991 A | * | 4/1953 | Stevens ........................ 403/383 |
| 4,421,191 A | * | 12/1983 | Bertin et al. .................. 180/417 |
| 4,422,531 A | * | 12/1983 | Ohtomi et al. ............... 254/362 |
| 4,450,729 A | | 5/1984 | Troeder et al. |
| 4,621,701 A | * | 11/1986 | Takabayashi et al. ........ 180/444 |
| 4,645,024 A | * | 2/1987 | Takabayashi ................ 180/444 |
| 4,676,331 A | | 6/1987 | Iwaki et al. |
| 4,724,711 A | * | 2/1988 | Sakakibara et al. ..... 73/862.322 |
| 4,724,917 A | * | 2/1988 | Naito et al. .................. 180/444 |
| 4,778,022 A | * | 10/1988 | Kamiya ....................... 180/446 |
| 4,784,234 A | * | 11/1988 | Naito et al. .................. 180/444 |
| 4,865,143 A | * | 9/1989 | Hashimoto et al. .......... 180/443 |
| 4,939,435 A | | 7/1990 | Takahashi et al. |
| 4,986,381 A | * | 1/1991 | Morishita et al. ............ 180/446 |
| 5,029,659 A | * | 7/1991 | Saito ........................... 180/443 |
| 5,046,372 A | | 9/1991 | Taniguchi et al. |
| 5,218,279 A | | 6/1993 | Takahashi et al. |
| 5,763,793 A | | 6/1998 | Ng et al. |
| 6,107,716 A | * | 8/2000 | Penketh ......................... 310/89 |
| 6,186,267 B1 | * | 2/2001 | Hackl et al. .................. 180/444 |
| 6,367,337 B1 | | 4/2002 | Schlabach |
| 6,386,313 B1 | * | 5/2002 | Choi ............................ 180/447 |
| 6,490,540 B1 | * | 12/2002 | Kurzeja et al. .............. 702/151 |
| 6,578,437 B1 | | 6/2003 | Moerbe |

(Continued)

OTHER PUBLICATIONS

Utility U.S. Appl. No. 11/731,353, filed Mar. 30, 2007; In re: Kiran Manohar Deshmukh et al., entitled *Torque Sensor for Electric Power Steering System*.

(Continued)

*Primary Examiner*—Lesley D Morris
*Assistant Examiner*—Wesley Potter
(74) *Attorney, Agent, or Firm*—Womble Carlyle Sandridge & Rice, PLLC (57) ABSTRACT

An electric power assist module for a steering system has an integrated housing for accommodating the torque sensor, motor and electronic control unit. A helical gear train including a pinion gear, an intermediate gear and steering gear are provided to transfer the motion from the motor to an output shaft that is coupled to an input shaft by way of a torsion bar.

15 Claims, 7 Drawing Sheets

U.S. PATENT DOCUMENTS

| | | | |
|---|---|---|---|
| 6,666,103 B2 * | 12/2003 | Gotoh | 74/412 R |
| 6,851,509 B2 * | 2/2005 | Hayakawa et al. | 180/444 |
| 6,880,254 B2 | 4/2005 | Uehira et al. | |
| 6,909,282 B2 | 6/2005 | Onishi et al. | |
| 6,929,090 B2 * | 8/2005 | Furumi et al. | 180/446 |
| 6,931,312 B2 | 8/2005 | Shin | |
| 7,021,418 B2 * | 4/2006 | Tominaga et al. | 180/444 |
| 7,201,070 B2 | 4/2007 | Tokumoto | |
| 7,311,173 B2 * | 12/2007 | Takimoto et al. | 180/446 |
| 7,412,906 B2 * | 8/2008 | Ponziani | 73/862.331 |
| 2002/0111763 A1 | 8/2002 | Koga | |
| 2004/0059486 A1 | 3/2004 | Takuma et al. | |
| 2004/0078166 A1 | 4/2004 | Shin | |
| 2004/0244209 A1 | 12/2004 | Uehira et al. | |
| 2005/0077101 A1 * | 4/2005 | Yamamoto et al. | 180/444 |
| 2007/0000716 A1 * | 1/2007 | Ponziani | 180/444 |
| 2007/0229062 A1 | 10/2007 | Katoh | |
| 2007/0241742 A1 | 10/2007 | Arakawa et al. | |
| 2007/0246290 A1 | 10/2007 | Deshmukh et al. | |
| 2009/0058405 A1 | 3/2009 | Oike et al. | |

OTHER PUBLICATIONS

Office Action mailed Apr. 1, 2009 for Utility U.S. Appl. No. 11/731,353; In re: Deshmukh et al., entitled Torque Sensor for Electric Power Steering System.

Notice of Allowance mailed Oct. 30, 2009 for Utility U.S. Appl. No. 11/731,353; In re: Deshmukh et al., entitled Torque Sensor for Electric Power Steering System.

* cited by examiner

PRIOR ART

FIG. 1

PRIOR ART

PRIOR ART

ELECTRIC POWER ASSIST MODULE FOR STEERING SYSTEM

CROSS-REFERENCE TO RELATED APPLICATION

The present application claims priority to Indian Patent Application No. 911/Del/2007, which was filed Apr. 24, 2007. The entire disclosure of Indian Patent Application No. 911/Del/2007, which was filed Apr. 24, 2007, is incorporated herein by reference.

BACKGROUND OF THE INVENTION

This present invention relates to an electric power assist module for a steering system and, more particularly, to such a module for a steering system of an off-highway vehicle.

Figure 1:
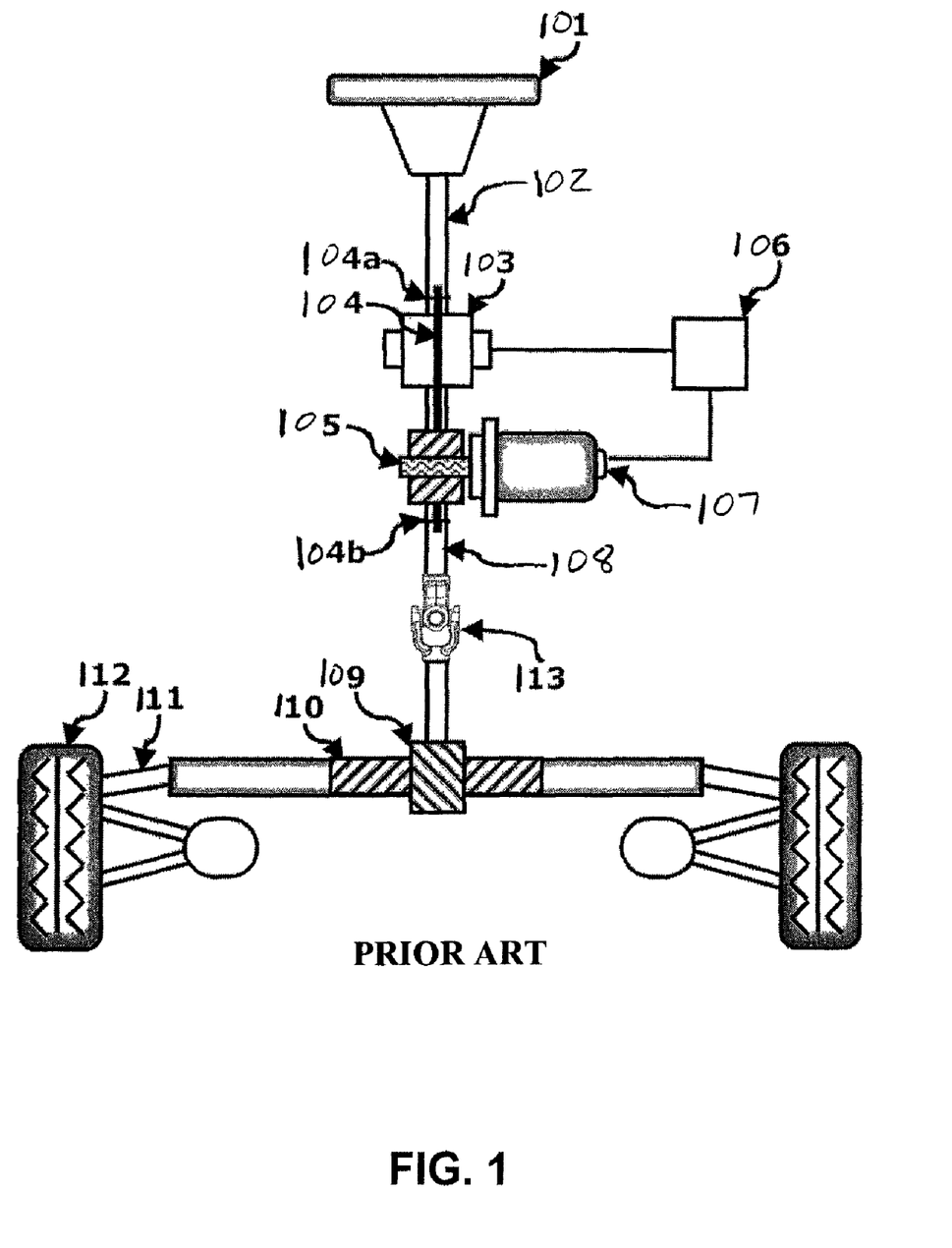
FIG. 1 schematically illustrates a conventional electric power steering system.
Figure 2:
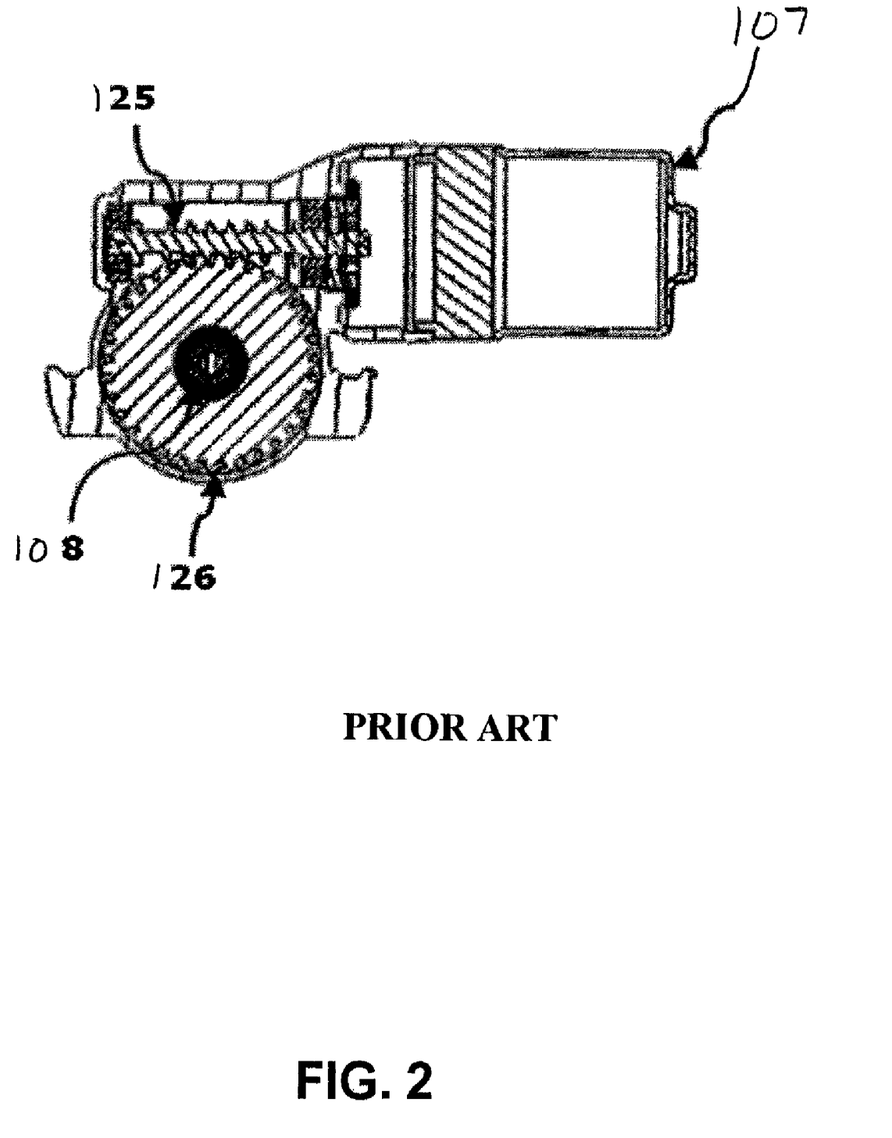
FIG. 2 schematically illustrates mounting of the motor and reduction gear mechanism of the conventional power steering system of FIG. 1.

An electric power steering system provides assistance to a driver through an electronically controlled motor in response to detection of the torque applied at the steering wheel. FIGS. 1 and 2 schematically illustrate an example of conventional electric power steering system. In general and as schematically shown in FIG. 1, the conventional electric power steering system of FIGS. 1 and 2 has a torsion bar 104 fixed coaxially between an input shaft 102 and output shaft 108 of the steering system. As shown in FIG. 1, the torsion bar 104 is fixedly connected to the input and output shafts 102, 108 by respective dowel pins 104a, 104b.

When a driver applies torque at the steering wheel 101, the torsion bar 104 experience twist and an associated torque sensor 103 sends an electrical signal proportional to the applied torque to an electronic control unit ("ECU") 106. The ECU 106 functions so that current is supplied to the motor 107 based on the signals from the torque sensor 103, so that the motor 107 applies assist torque to the output shaft 108 through a reduction gear mechanism 105. The output shaft 108 steers the tires 112 via tie-rods 111 and a rack and pinion gear mechanism 110, 109. A universal joint 113 is used between the output shaft 108 and the pinion gear 109 when the pinion gear 109 and the output shaft 108 have different axes.

The torque sensor 103, input shaft 102, output shaft 108, reduction gear mechanism 105 and motor 107 of the conventional electric power steering system of FIGS. 1 and 2 are together mounted in one housing, whereas the ECU 106 is placed in a separate housing. This requires an external wire harness for the ECU 106 to communicate between the torque sensor 103 and the motor 107. As best understood with reference to FIG. 2, the motor 107 of the illustrated conventional electric power steering system is mounted tangential to the output shaft 108, and a worm and worm wheel mechanism 125, 126 is used to transfer the motion from the motor 107 to the output shaft 108. The worm and worm wheel mechanism 125, 126 is used to provide a very high reduction ratio, usually 13~20, between motor 107 and output shaft 108.

It is known for a conventional electric power steering system for an automotive application to be designed for mounting in the passenger compartment; therefore, features like water protection, heat resistance etc. are less critical.

Disadvantages of at least one known conventional electric power steering system include high cost, a high precision reduction gear mechanism, a relatively large amount of space in a tangential direction, poor returnability, high torque variation at the steering wheel when mounted in an intermediate shaft between two universal joints, an external wire harness to connect the ECU to the torque sensor and motor, and inability to sustain the harsh environmental conditions of an off-highway vehicle application.

BRIEF SUMMARY OF SOME ASPECTS OF THE INVENTION

One aspect of the present invention is the provision of improvements with respect to an electric power steering system.

In accordance with one aspect of the present invention, an electric power assist module for a steering system has an integrated housing for at least partially accommodating the torque sensor, motor and electronic control unit ("ECU"). A helical gear train may be provided to transfer the motion from the motor to an output shaft. The output shaft may be coupled to an input shaft by way of a torsion bar. The helical gear train may include a pinion gear, an intermediate gear and a steering gear.

A lower housing may be mounted to the integrated housing. The lower housing may contain the helical gear train.

An upper cover may be mounted to the integrated housing. The input shaft may be rotatably mounted to the upper cover so that the input shaft is aligned with the output shaft.

The motor may extend through an opening in the upper cover. A seal may be provided between the motor and the upper cover for providing a substantially hermetic seal between the upper cover and the motor (e.g., to protect against water entering the integrated housing).

The ECU may be protected from dust and water (e.g., may be closed in a substantially hermetically sealed chamber) by a separate cover (e.g., a side cover that closes the ECU within a cavity of the integrated housing).

Wiring of the ECU may be provided with a substantially water-proof connector that is mounted on the integrated housing.

In accordance with one aspect of the present invention, the motor has a drive shaft, and the pinion gear may be carried by a carrying shaft having opposite first and second ends. The first end of the carrying shaft may be mated to the drive shaft. The second end of the carrying shaft may be supported in the lower housing.

In accordance with an embodiment of the present invention, the pinion gear is meshed with the intermediate gear, and the intermediate gear is meshed with the steering gear. The intermediate gear may be carried by a carrying shaft having opposite first and second ends. The first end of the intermediate gear's carrying shaft may be supported in the integrated housing. The second end of the intermediate gear's carrying shaft may be supported in the lower housing. The steering gear may be press fit onto the output shaft.

The output shaft may be rotatably carried by each of a first bearing, which is supported by the integrated housing, and a second bearing, which is supported by the lower housing.

The input shaft and the output shaft may be operatively associated with one another via a cavity being in receipt of a profile. The cavity and the profile may be cooperative for allowing, yet restricting to a predetermined limit, relative rotation between the input shaft and the output shaft. The cavity and the profile may each be substantially triangular.

In accordance with a first embodiment of the present invention, the ECU comprises a processing apparatus (e.g., a microcontroller, computer, or the like) that is operatively associated with (e.g., in electrical communication with via one or more wires) the torque sensor for receiving signals indicative of torque applied to the input shaft. In accordance with the first embodiment, the processing apparatus is operative for generating a pulse width modulation signal that is proportional to the torque applied to the input shaft, and the motor operates responsively to the pulse width modulation signal. In one example, the processing apparatus comprises a processor (e.g., computer processor, or the like) and an algorithm (e.g., one or more programs, software modules or the like for providing instructions to the processor with regard to how the data is to be processed).

The electric power assist module may be in combination with at least an upper shaft, lower shaft, rack and pinion mechanism, and steering shaft. The upper shaft may comprise two universal joints. The lower shaft may comprise two universal joints. The upper shaft may be positioned between and connected to each of the steering shaft and the input shaft. The lower shaft may be positioned between and connected to each of the output shaft and a pinion gear of the rack and pinion mechanism. Axes of the pinion gear of the rack and pinion mechanism, input shaft, output shaft and steering shaft may be in different planes.

Other aspects and advantages of the present invention will become apparent from the following.

BRIEF DESCRIPTION OF THE DRAWINGS

The accompanying drawings, which are listed below, are not necessarily drawn to scale.

FIG. 6 is an isolated, partially exploded view of the torsion bar, input shaft and output shaft of the electric power assist module, and FIG. 6 shows a triangular profile of the input shaft and a triangular cavity of the output shaft that are for allowing a limited range of angular relative movement between the input and output shafts, in accordance with the first embodiment of the present invention.

FIG. 7 is a cross-sectional view of the torsion bar, input shaft and output shaft in an assembled configuration, with the cross-section taken perpendicularly to their lengths and through the triangular profile and the triangular cavity, in accordance with the first embodiment of the present invention.

DETAILED DESCRIPTION

Referring now in greater detail to the drawings, in which like numerals refer to like parts throughout the several views, examples of embodiments of the present invention are described in the following.

One aspect of a first embodiment of the present invention is the provision of a compact, cost effective and integrated electric power assist module (EPAM) 33 (FIG. 3) that is suitable for an off-highway vehicle and provides steering assist to the driver with reduced torque variation at the steering wheel 1. For example and as will be discussed in greater detail below, the EPAM 33 of the first embodiment of the present invention utilizes a simple and easy to manufacture reduction gear that is in the form of a helical gear train 23, 22, 24. The helical gear train 23, 22, 24 can provide a high torque handling capability that may be required for off-highway vehicle applications, and can have very high reverse efficiency that may be required for better returnability in the steering system. The EPAM 33, as well as the overall power steering systems disclosed herein, may be used in a wide variety of vehicles that are not limited to off-highway vehicles.

Figure 3:
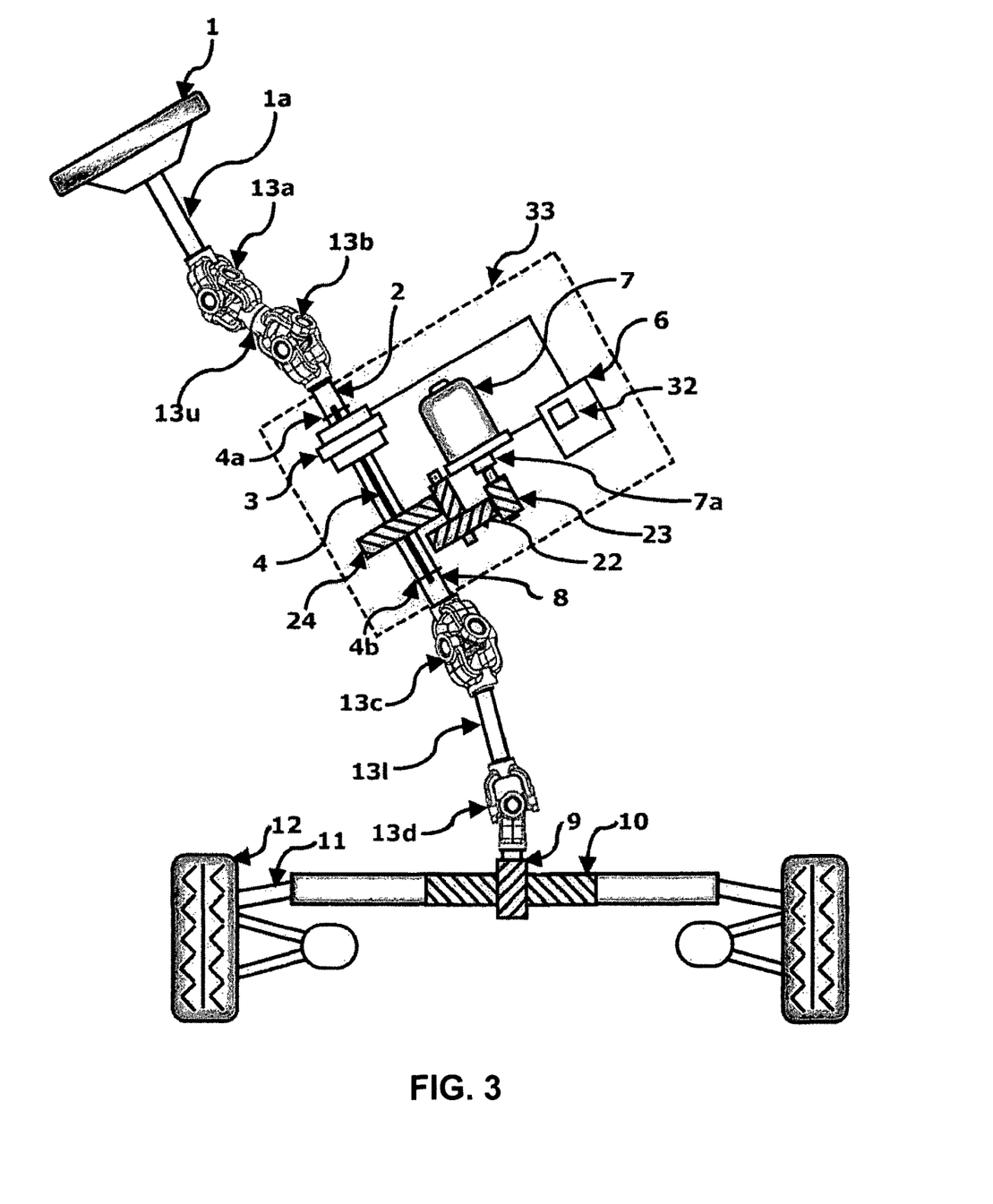
FIG. 3 schematically illustrates an electric power steering system that includes an electric power assist module, according to a first embodiment of the present invention.

The dashed line block shown in FIG. 3 schematically illustrates the EPAM 33 of the first embodiment of the present invention. As shown, the EPAM 33 includes an input shaft 2, motor 7 and output shaft 8. The motor 7 is mounted parallel to the collinear axes of the input and output shafts 2, 8. The helical gear train 23, 22, 24 is used to transfer motion of the motor 7 to the output shaft 8. The EPAM 33 further includes a torque sensor 3 and an electronic control unit (ECU) 6. As will be discussed in greater detail below, the torque sensor 3 detects the torque applied at the steering wheel 1 (e.g., the torque applied to the input shaft 2) and provides a proportional electrical signal to the ECU 6. The ECU 6 functions so that electrical current is supplied to the motor 7 based on the signals from the torque sensor 3, so that the motor 7 applies assisting torque, which is in the same direction as the torque applied to the steering wheel 1 by the driver, to the output shaft 8 by way of the helical gear train 23, 22, 24.

For background purposes it is noted that when a drive shaft and a driven shaft are joined by a universal joint (which is positioned between the drive and driven shafts) at an angle other than one hundred and eighty degrees with respect to one another (i.e., the two shafts are not collinear), then the driven shaft does not rotate with constant angular speed in relation to the drive shaft, which causes a "torque variation". In accordance with the power steering system of the first embodiment of the present invention, which is schematically illustrated in FIG. 3, even though universal joints are used, they are arranged in a manner that seeks to avoid such a "torque variation". More specifically and in accordance with the power steering system of the first embodiment of the present invention, an upper shaft 13u, which comprises a pair of universal joints 13a, 13b, and a lower shaft 13l with universal joints 13c, 13d, are arranged with respect to the EPAM 33 and one another in a manner that seeks to minimize any "torque variation" at the steering wheel 1. However, the EPAM 33 can be used in power steering systems with more or less (e.g., zero) universal joints, as will be discussed in greater detail below.

In accordance with the power steering system of the first embodiment of the present invention, the input shaft 2 of the EPAM 33 is connected to a steering shaft 1a, which carries the steering wheel 1, by way of the upper shaft 13u/universal joints 13a, 13b; and the output shaft 8 of the EPAM 33 is connected to a pinion gear 9 by way of the lower shaft 13l and universal joints 13c, 13d. The input and output shafts 2, 8 of the EPAM 33 are connected to one another by way of a torsion bar 4 of the EPAM 33. More specifically, a first end of the torsion bar 4 is connected to the input shaft 2 in any suitable manner so that the first end of the torsion bar 4 rotates with the input shaft. An opposite second end of the torsion bar 4 is connected to the output shaft 8 in any suitable manner so that the second end of the torsion bar 4 rotates with the output shaft. More specifically and in accordance with the first embodiment of the present invention, the torsion bar 4 is fixedly connected to the input and output shafts 2, 8 by respective dowel pins 4a, 4b. The torsion bar 4 can be twisted, so that there can be relative rotation between the input and output shafts 2, 8.

As will be discussed in greater detail below, when a driver applies torque to the steering wheel 1, the torsion bar 4 twists (i.e., experiences torsion). The torque sensor 3 is operatively associated with the input and output shafts 2, 8 so as to detect/measure the twist in the torsion bar 4 and thereby determine or otherwise quantify the applied torque (e.g., the torque being applied to the steering wheel 1 and thereby to the input shaft 2). As will be discussed in greater detail below, the torque sensor 3 sends an electrical signal proportional to the applied torque to the ECU 6, and the ECU responsively supplies electrical current to the motor 7 based on the signals from the torque sensor 3, so that the motor 7 applies assist torque to the output shaft 8 through the reduction gear/helical gear train 23, 22, 24. More specifically and in accordance with the first embodiment of the present invention, the ECU 6 supplies a pulse width modulation signal to the motor 7, as will be discussed in greater detail below with reference to FIG. 8. The output shaft 8 rotates the pinion gear 9 by way of the lower shaft 13l and universal joints 13c, 13d. A rack 10 that is meshed with the pinion gear 9 moves in response to the rotation of the pinion gear 9, so that tires 12 are steered by way of tie-rods 11.

Figure 4:
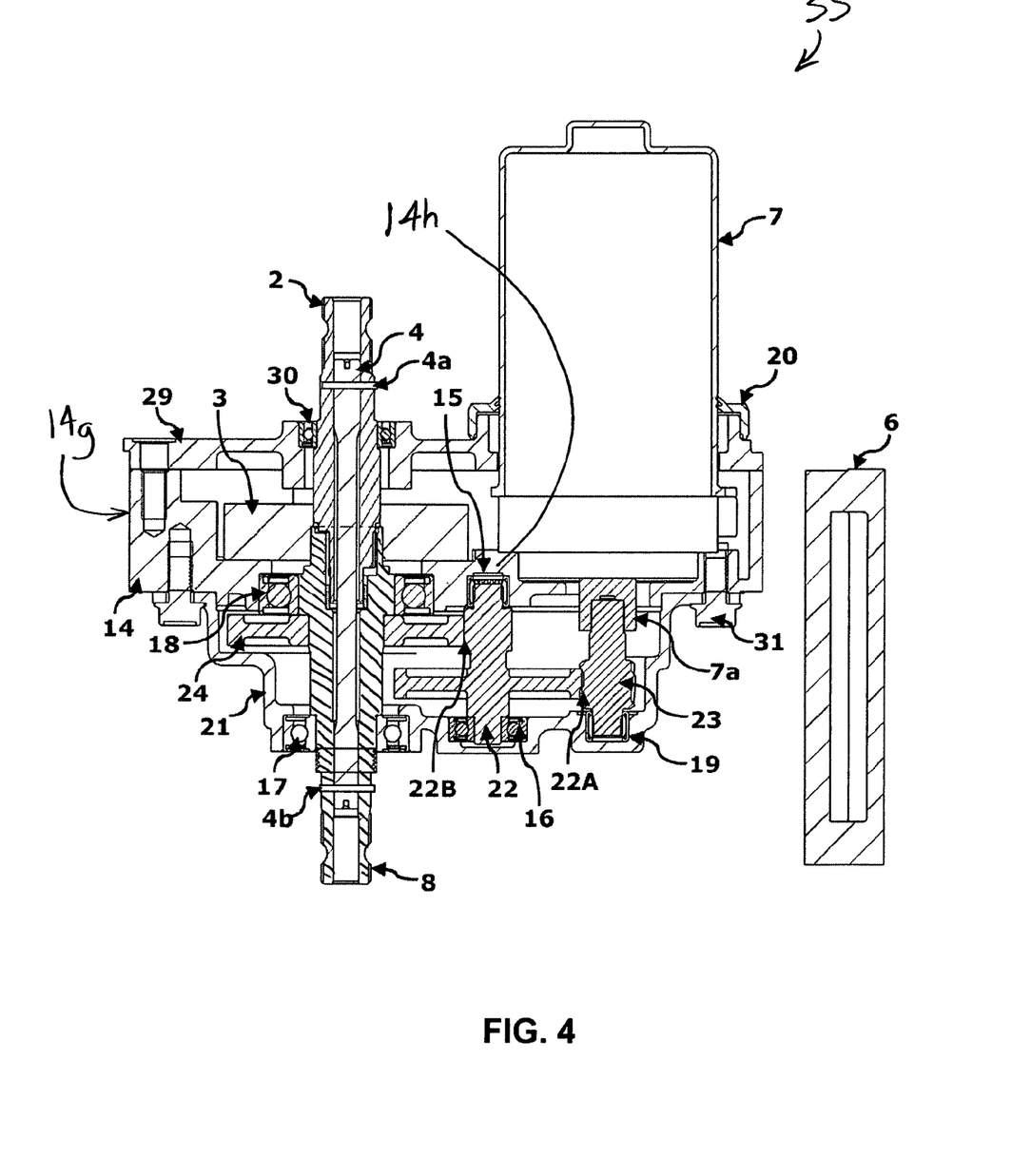
FIG. 4 is an isolated, partially schematic, cross-sectional view of the electric power assist module of FIG. 3.
Figure 5:
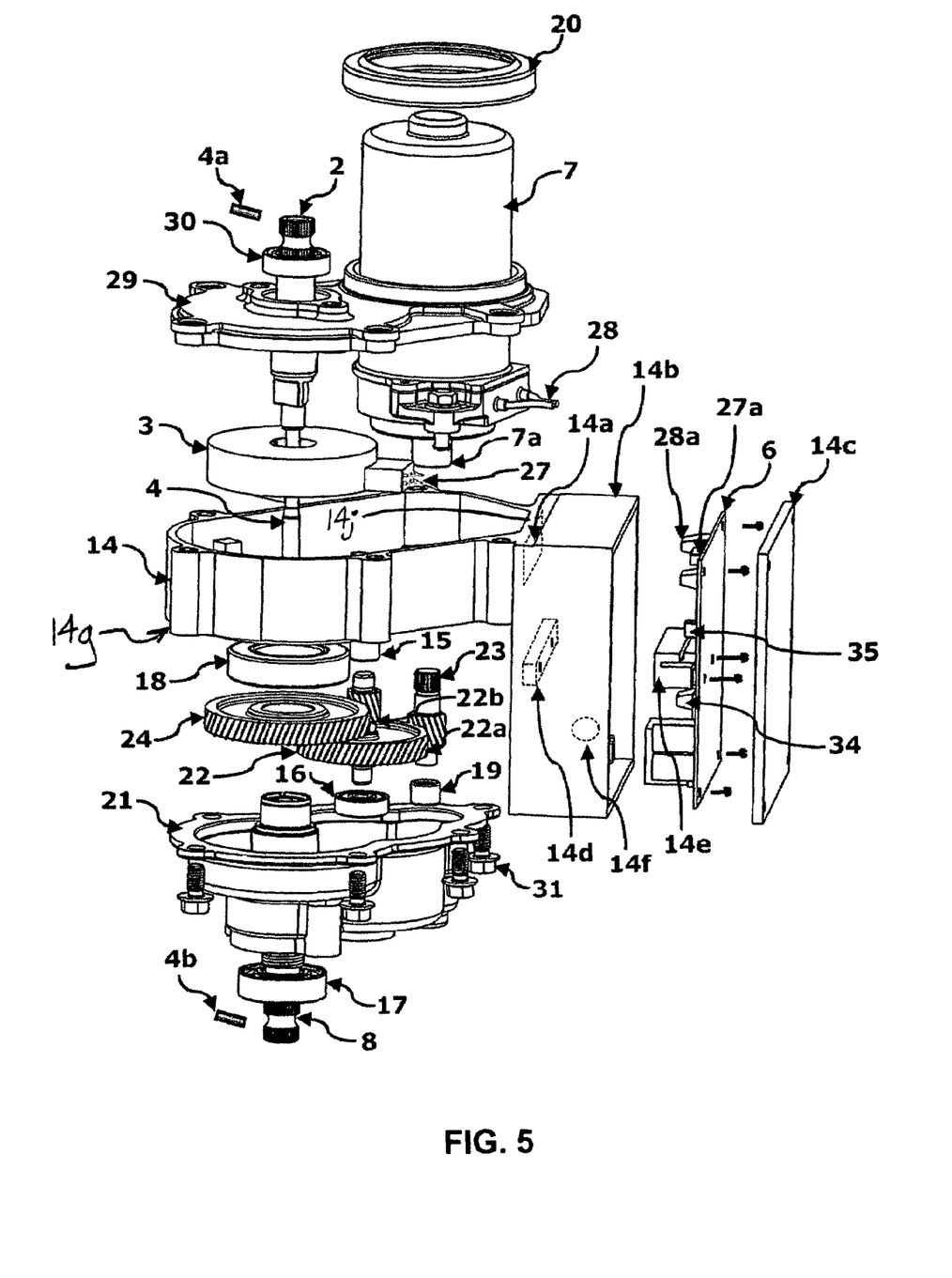
FIG. 5 is a partially schematic, partially exploded view of the electric power assist module of FIGS. 3 and 4.

FIG. 4 is an isolated, partially schematic, cross-sectional view of the EPAM 33, and FIG. 5 is partially schematic, exploded view of the EPAM 33, in accordance with the first embodiment of the present invention. In accordance with the first embodiment, the EPAM 33 has a compact, water proof, composite housing that includes an integrated housing 14, lower housing cover 21, upper housing cover 29 and side housing cover 14c. The composite housing may be fixedly mounted to a rigid portion of the body of the vehicle that includes the steering system shown in FIG. 3, and as a more specific example it may be mounted outside the passenger compartment of the vehicle, and the vehicle may be an off-highway vehicle.

The integrated housing 14 together with the upper housing cover 29 and side housing cover 14c accommodates the torque sensor 3, ECU 6, and motor 7. The integrated housing 14 together with the lower housing cover 21 accommodates the helical reduction gear train 23, 22, 24. Communication of the ECU 6 with the torque sensor 3 and the motor 7 is through internal wiring, namely wiring that is within the integrated housing 14, as will be discussed in greater detail below. The motor 7 is arranged vertically, parallel to the axis of the input shaft 2. The helical gear train 23, 22, 24 transfers the motion from the drive shaft 7a of the motor 7 to the output shaft 8 of the EPAM 33 at a reduction ratio of 13~20 (e.g., a reduction ratio of about 13 to 1, about 14 to 1, about 15 to 1, about 16 to 1, about 17 to 1, about 18 to 1, about 19 to 1, or about 20 to 1). The relatively high reduction ratio is used to reduce the angular speed of the motor 7 and increase the output torque. The ECU 6 controls the power of the motor 7 based upon the torque applied by the driver at the steering wheel 1. Total output torque at the output shaft 8 is the sum of torque applied by the driver at the steering wheel 1 and the assist torque provided by EPAM 33. The assist torque provided by EPAM 33 is the product of the torque supplied by the motor 7 and the reduction ratio (i.e., the torque supplied by the motor 7 multiplied by the reduction ratio provided by the helical gear train 23, 22, 24).

Referring to the integrated housing 14 in greater detail, it includes a body that includes a main section 14g and a side section 14b. The body of the integrated housing 14 may be formed as a single piece that includes both the main section 14g and the side section 14b. Alternatively, the main section 14g and the side section 14b may be joined to one another after being formed separately. The main section 14g of the integrated housing 14 includes a lower side and an upper side, with the upper side defining an upwardly open cavity/a relatively large upper opening that is seen in FIG. 5. The lower housing cover 21, upper housing cover 29 and side housing cover 14c are respectively mounted to the sections 14g, 14b of the integrated housing 14 to respectively at least partially define upper, lower and side chambers of the composite housing, as will be discussed in greater detail below. Typically silicon sealant is used between the covers 21, 29, 14c and the integrated housing 14 for water protection (e.g., to substantially hermetically seal the chambers of the composite housing from the ambient environment).

The upper housing cover 29 is mounted to the upper side of the main section 14g of the integrated housing 14, such as with bolts or other fasteners and sealing mechanism(s), to at least substantially close (e.g., completely close) the upper opening of the main section 14g with a substantially hermetic seal. As a result, the upper housing cover 29 and the main section 14g of the integrated housing 14 together form an upper chamber of the composite housing.

The lower housing cover 21 may also be referred to as a lower housing, for example since it defines an upwardly open cavity/a relatively large upper opening that is seen in FIG. 5. The lower housing cover 21 is mounted to the bottom side of the main section 14g of the integrated housing 14, such as with bolts or other fasteners and sealing mechanism(s), to at least substantially close (e.g., completely close) the upper opening of the lower housing cover 21 with a substantially hermetic seal. As a result, the lower housing cover 21 and the lower portion of the main section 14g of the integrated housing 14 together form a lower chamber of the composite housing. As best understood with reference to FIG. 4, the composite housing's upper and lower chambers can be characterized as being contiguous with one another, for example, because they each include/share a lower wall 14h of the integrated housing 14, although other arrangements are within the scope of the present invention.

The side section 14b of the integrated housing 14 defines an open cavity/a relatively large side opening that is seen in FIG. 5. The side housing cover 14c is mounted to the side of the side section 14b of the integrated housing 14, such as with bolts or other fasteners and sealing mechanism(s), to at least substantially close (e.g., completely close) the side opening of the side section 14b with a substantially hermetic seal. As a result, the side housing cover 14c and the side section 14b of the integrated housing 14 together form the side chamber of the composite housing. As best understood with reference to FIG. 5, the composite housing's upper and side chambers can be characterized as being contiguous with one another, for example, because they each include/share a side wall 14j of the integrated housing 14, although other arrangements are within the scope of the present invention.

The composite housing's lower chamber, which is at least partially formed by the lower housing cover 21 and the lower portion of the main section 14g of the integrated housing 14, contains the helical gear train 23, 22, 24. Referring to the helical gear train 23, 22, 24 in greater detail, the pinion gear 23 (e.g. an end of a shaft that carries the pinion gear 23) is co-axially fitted to (e.g., mated with/fixedly attached to) the drive shaft 7a of the motor 7. That is, the pinion gear 23 is connected to the drive shaft 7a of the motor 7 so that the pinion gear 23 rotates with the drive shaft 7a. The pinion gear 23 (e.g. an end of the shaft that carries the pinion gear 23) is supported by the lower housing cover 21 by way of a bearing 19. The bearing 19 keeps the axis of the pinion gear 23 aligned with the rotational axis of the drive shaft 7a of the motor 7. The pinion gear 23 is meshed with a gear 22A of the intermediate gear 22. Opposite ends of the shaft of the intermediate gear 22 are respectively supported by the integrated housing 14 and the lower housing cover 21 respectively by way of bearings 15, 16. The bearings 15, 16 aid in smooth rotation of the intermediate gear 22. A gear 22b of the intermediate gear 22 is meshed with the steering gear 24. The steering gear 24 is press-fit onto the output shaft 8. That is, the steering gear 24 is connected to the output shaft 8 so that the output shaft 8 rotates with the steering gear 24. The output shaft 8 is supported by the integrated housing 14 and the lower housing cover 21 respectively by way of bearings 18, 17. As mentioned above, the output shaft 8 is coaxially connected to the input shaft 2 by way of the torsion bar 4. The input shaft 2 is supported by the upper housing cover 29 by way of a bearing 30. The bearings 17, 18 and 30 keep the input and output shafts 2, 8 coaxially aligned.

The composite housing's upper chamber, which is at least partially formed by the upper housing cover 29 and the main section 14g of the integrated housing 14, contains the torque sensor 3 and at least partially contains the motor 7. Referring to the motor 7 more specifically, it extends through a corresponding opening in the upper housing cover 29. A seal 20 is provided between the motor 7 and the upper housing cover 29 for water protection (e.g., to provide a substantially hermetic seal).

The composite housing's side chamber, which is at least partially formed by the side housing cover 14c and the side section 14b of the integrated housing 14, contains the ECU 6. That is, the ECU 6 is positioned in the side section 14b of the integrated housing 14. The ECU is mounted to a section 14d of the integrated housing 14 by way of a heat sink 14e in order to dissipate heat of the electronic components of the ECU 6. The section 14d is hidden from view in FIG. 5 and, therefore, it is schematically illustrated by dashed lines.

The body of the integrated housing 14 (i.e., the body that includes the main and side sections 14g, 14b of the housing) defines/has a hole 14a that extends through the side wall 14j (FIG. 5). Internal wires 27, 28 extend through the hole 14a to connect the ECU 6 to the torque sensor 3 and motor 7, respectively. The hole 14a is hidden from view in FIG. 5 and, therefore, it is schematically illustrated by dashed lines. The hole 14a is a passageway that extends between (e.g., has opposite ends respectively open at each of) the interior of the composite housing's upper chamber, which is at least partially formed by the upper housing cover 29 and the main section 14g of the integrated housing 14, and the composite housing's side chamber, which is at least partially formed by the side housing cover 14c and the side section 14b of the integrated housing 14. The torque sensor 3 is connected to connector(s) 27a of the ECU 6 via the internal wires 27. The motor 7 is connected to connector(s) 28a of the ECU 6 via internal wires 28.

Another hole 14f (e.g., opening, passageway or the like) is provided in (e.g., extends through a side wall of) the section 14b of the integrated housing 14. The hole 14f is hidden from view in FIG. 5 and, therefore, it is schematically illustrated by dashed lines. External wires (not shown) that originate outside the EPAM 33 pass through the hole 14f and into the interior of section 14b of the integrated housing 14 where they are connected to the ECU 6, to provide battery power, an "engine on" signal and "vehicle speed sensor" signal to the ECU 6. More specifically, the hole 14f is typically sealed with a water-proof connector or connectors (or other sealing mechanisms) to provide a substantially hermetic seal at the hole 14f, and the external wires typically are connected to the water-proof connector(s), with internal wires extending from the water-proof connector(s) to the ECU 6. The dashed lines that are schematically illustrative of the hole 14f in FIG. 5 are also schematically illustrative of the one or more water-proof connectors that close the hole 14f and can be characterized as being a substantially water-proof connector on the integrated housing 14. Wire(s) (not shown) extending inwardly from the hole 14f are connected to connector(s) 35 on the ECU 6 to provide the "engine on" signal and the "vehicle speed sensor" signal to the ECU 6. Wire(s) (not shown) extending inwardly from the hole 14f (e.g., and supplying electrical power from battery(s) of the vehicle) are connected to connector(s) 34 of the ECU 6 to provide electrical power to the ECU 6.

Figures 6, 7:
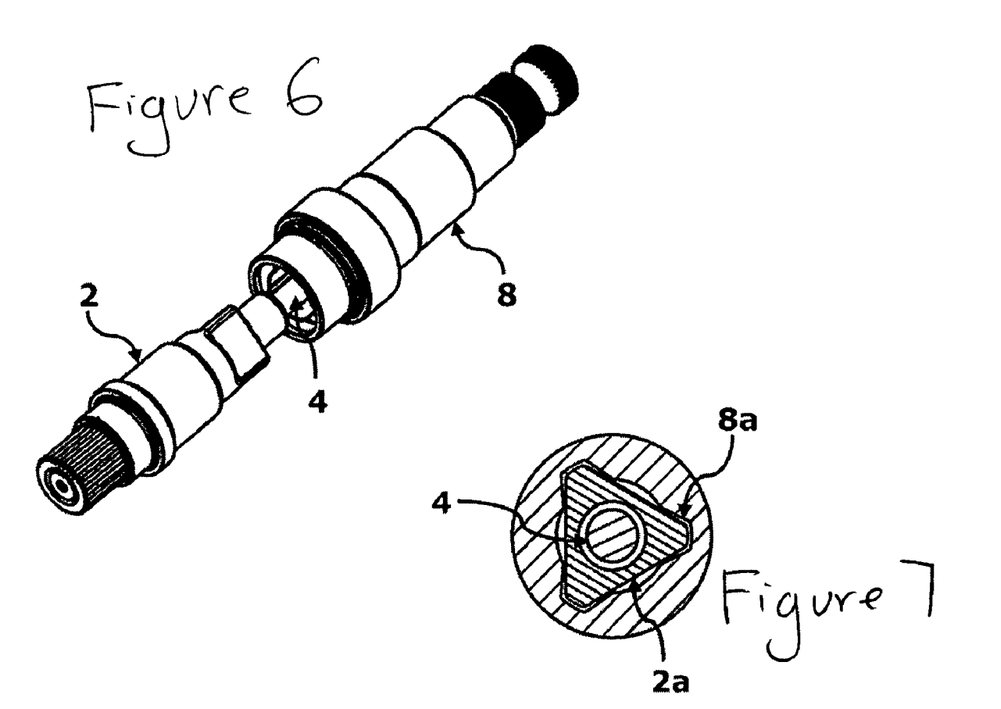

Referring to FIGS. 6 and 7 in greater detail, they show a profile 2a (e.g., a triangular profile) of the input shaft 2 that fits into a substantially correspondingly-shaped cavity 8a (e.g., a triangular cavity) of the output shaft 8. The profile 2a and cavity 8a are configured (e.g., predetermined clearance is provided therebetween) for allowing, yet restricting to a desired limit, angular relative movement between the input and output shafts 2, 8. In accordance with the first embodiment of the present invention, the limited angular relative movement can be more specifically characterized as relative rotation between the input shaft 2 and the output shaft 8 with the relative rotation being about the coaxial, lengthwise axes of the input and output shafts.

Because the opposite ends of the torsion bar 4 respectively rotate with the input and output shafts 2, 8, the torsion bar 4 typically twists when the steering wheel 1 is turned. The torsion bar 4 is designed for a particular torque range, which one should experience in normal driving conditions. Higher torque, which may occur in certain situations, can damage the torsion bar 4 either by permanently deforming it or bringing in more hysteresis, as a result of the torsion bar being twisted beyond its primary linear range. Permanent deformation and/or hysteresis in the torsion bar 4, even at very small scales, accumulates over a period of time and eventually deteriorates the quality of the electrical signals provided by the torque sensor 3. Accordingly and in accordance with the first embodiment of the present invention, an arrangement is provided for protecting the torsion bar 4 from having excessive torque applied thereto. This arrangement can be referred to as a "fail-safe arrangement", and this fail-safe arrangement can be provided by the cooperation between the profile 2a (e.g., the triangular profile) of the input shaft 2 and the correspondingly-shaped cavity 8a (e.g., the triangular cavity) of output shaft 8.

In accordance with the first embodiment of the present invention, the triangular profile 2a of the input shaft 2 is inserted into the triangular cavity 8a of the output shaft 8 with there being a predetermined angular clearance between the triangular profile 2a and the triangular cavity 8a. This angular clearance allows the torsion bar 4 to twist (e.g., in response to rotation of the input shaft 2 that occurs in response to torque being applied to the steering wheel 1) until the clearance between the triangular profile 2a and the triangular cavity 8a becomes zero. Once the clearance between the triangular profile 2a and the triangular cavity 8a becomes zero, the twist of the torsion bar 4 is limited by the torsional stiffness of the steering column, which is relatively high (as compared to the torsional stiffness of the torsion bar 4) and thus protects the torsion bar from crossing over the linear elastic range.

Figure 8:
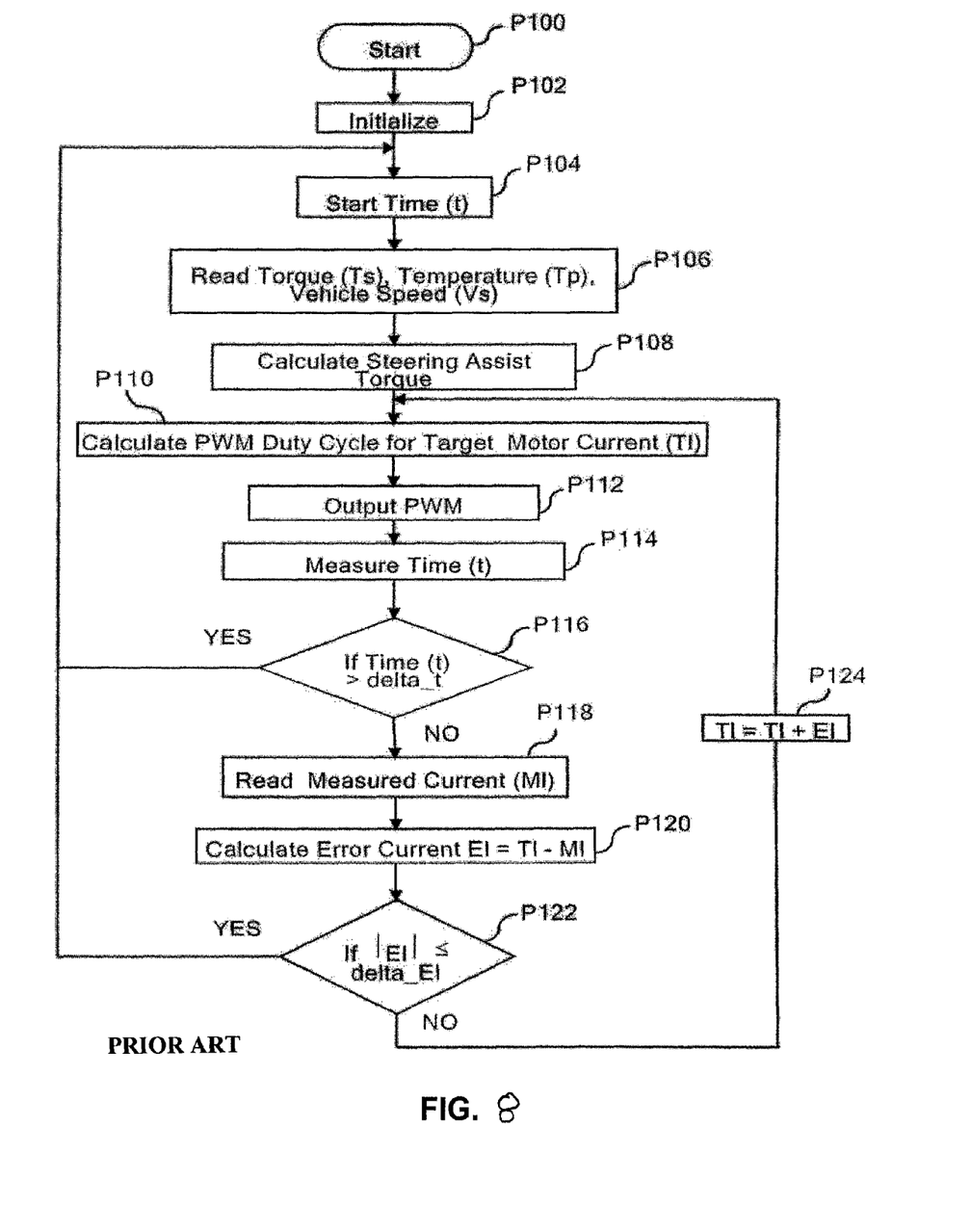
FIG. 8 presents a flowchart that illustrates a method that may be used for generating a pulse width modulation signal proportional to the torque applied at the steering wheel, in accordance with the first embodiment of the present invention.

In accordance with the first embodiment of the present invention, the ECU 6 includes a processor 32 (e.g., computer processor) that is schematically illustrated as a box within the ECU in FIG. 3, and the processor 32 includes (e.g., executes)

a program (e.g., algorithm, software module, or the like, which is schematically illustrated by FIG. 8) for controlling the provision of the pulse width modulation ("PWM") signal, which is proportional to the torque applied at the steering wheel 1, to the motor 7, in accordance with the first embodiment of the present invention. FIG. 8 presents a flow chart that illustrates operations, steps, software modules or the like associated with the processor 32 executing the program for generating the PWM signal that is proportional to the torque applied at the steering wheel 1, in accordance with the first embodiment of the present invention.

Referring in greater detail to FIG. 8, at block P100 the program starts. At block P102 the processor 32 initializes various variables and checks the memory blocks (e.g., computer memory). At block P104, a timer is started. At block P106, signals indicative of voltage of the torque sensor 3 (torque sensor voltage Ts), temperature of the ECU 6 (ECU temperature Tp) and speed of the vehicle that includes the power steering system (vehicle speed Vs) are read. Steering assist torque is calculated at block P108 based on the torque sensor voltage Ts, vehicle speed Vs and ECU temperature Tp. At block P110, the duty cycle of the PWM signal for the target current TI is calculated. The PWM signal is provided as an output at block P112. Blocks P114 and 116 will be discussed below. At block P118, a signal indicative of a measured current MI is read. The signal indicative of the measured current MI is from a current sensor that measures the current flowing through the motor 7. At block P120, a difference/error EI between the target current TI and the measured current MI is calculated. The absolute value of the error EI is judged block P122. If it is determined at block P122 that the absolute value of EI is greater than a predetermined error "delta_EI", then the target current TI is modified at block P124 to minimize the error EI. After minimizing the error EI, the next value of the torque sensor voltage Ts, ECU temperature Tp and vehicle speed Vs are read and the PWM signal is set as per the new value from the torque sensor.

Referring back to block P114, time t is measured at block P114. To protect the system from hangover in error EI minimization, the time t is judged at block P116. If it is determined at block P116 that the time t is greater than a predefined time interval "delta-t", then the next value of the torque sensor voltage Ts, ECU temperature Tp and vehicle speed Vs are read.

The torque sensor voltage Ts is used to calculate the direction as well as amount of steering assist desired. Vehicle speed Vs is used to calculate amount of assist required for safe and easy steering of the vehicle. ECU 6 temperature Tp is used to protect the ECU 6 from damage due to temperature rise of ECU 6 beyond predefined limits by excessive/abusive use of the system.

As mentioned above, the EPAM 33 can be used in power steering systems with more or less, or no universal joints. For example and in accordance with a second embodiment of the present invention, an electric power steering system can be like the electric power steering system shown and described with reference to FIG. 1, except that, and generally described, the above-discussed EPAM 33 of the first embodiment of the present invention takes the place of the following components of FIG. 1: the input shaft 102, torque sensor 103, torsion bar 104, dowel pins 104a, 104b, reduction gear mechanism 105, ECU 106, motor 107 and output shaft 108. As an additional example, a third embodiment of the present invention is like the second embodiment of the present invention, except that the universal joint 113 (FIG. 1) is omitted because the output shaft 8 and the pinion gear 109 are coaxial in the third embodiment.

It will be understood by those skilled in the art that while the present invention has been discussed above with reference to exemplary embodiments, various additions, modifications and changes can be made thereto without departing from the spirit and scope of the invention as set forth in the following claims.

What is claimed is:

1. An electric power assist module for a steering system, with the electric power assist module comprising:
    an integrated housing formed as a single piece;
    a torque sensor that is at least partially contained by the integrated housing;
    a motor that is at least partially contained by the integrated housing, wherein
        the motor includes a body and a rotatable drive shaft that protrudes from the body, and
        the motor being at least partially contained by the integrated housing comprises the body being at least partially contained by the integrated housing;
    an electronic control unit that is at least partially contained by the integrated housing;
    a first electrical connection, wherein the first electrical connection extends from the torque sensor to the electronic control unit for providing signals from the torque sensor to the electronic control unit, and the first electrical connection is at least partially contained within the integrated housing;
    a second electrical connection, wherein the second electrical connection extends from the electronic control unit to the motor for providing power to the motor in response to the signals from the torque sensor, and the second electrical connection is at least partially contained within the integrated housing;
    an input shaft;
    an output shaft;
    a torsion bar having opposite first and second ends, wherein the first end of the torsion bar is connected to the input shaft so that the first end of the torsion bar rotates with the input shaft, and the second end of the torsion bar is connected to the output shaft so that the second end of the torsion bar rotates with the output shaft;
    a reduction gear assembly for transferring motion from the motor to the output shaft, wherein the reduction gear assembly comprises a helical gear train including a pinion gear, an intermediate gear and a steering gear;
    a lower housing that is mounted to the integrated housing, wherein the lower housing at least partially contains the helical gear train; and
    an upper cover mounted to the integrated housing, wherein
        the input shaft is rotatably mounted to the upper cover so that the input shaft is aligned with the output shaft,
        the motor extends through a first opening in the upper cover,
        a seal is provided between the motor and the upper cover for providing a substantially hermetic seal between the upper cover and the motor, and
        the input shaft extends through a second opening in the upper cover.

2. The electric power assist module according to claim 1, comprising a side cover, wherein:
    the integrated housing defines a cavity with a side opening;
    the side cover substantially hermetically closes the side opening; and
    the electronic control unit is positioned in the cavity.

3. The electric power assist module according to claim 1, wherein:

the pinion gear is carried by a carrying shaft having opposite first and second ends;
the first end of the carrying shaft is mated to the drive shaft; and
the second end of the carrying shaft is supported in the lower housing.

4. The electric power assist module according to claim 1, wherein:
the pinion gear is meshed with a first gear of the intermediate gear;
a second gear of the intermediate gear is meshed with the steering gear;
the first gear of the intermediate gear has a helix angle;
the second gear of the intermediate gear has a helix angle;
the intermediate gear is carried by a carrying shaft having opposite first and second ends;
the first end of the carrying shaft is supported in the integrated housing;
the second end of the carrying shaft is supported in the lower housing; and
the steering gear is press fit onto the output shaft.

5. The electric power assist module according to claim 1, comprising a first bearing and a second bearing, wherein:
the first bearing is supported by the integrated housing;
the second bearing is supported by the lower housing; and
the output shaft is rotatably carried by each of the first and second bearings.

6. The electric power assist module according to claim 1, wherein:
the input shaft and the output shaft are operatively associated with one another via a cavity being in receipt of a profile; and
the cavity and the profile are cooperative for allowing, yet restricting to a predetermined limit, relative rotation between the input shaft and the output shaft.

7. The electric power assist module according to claim 6, wherein the cavity and the profile are each substantially triangular.

8. The electric power assist module according to claim 1, wherein:
the electronic control unit comprises a processing apparatus;
the processing apparatus is operatively associated with the torque sensor for receiving signals indicative of torque applied to the input shaft;
the processing apparatus is operative for generating a pulse width modulation signal that is proportional to the torque applied to the input shaft; and
the motor operates responsively to the pulse width modulation signal.

9. The electric power assist module according to claim 1 in combination with at least:
an upper shaft, a lower shaft, a rack and pinion mechanism, and a steering shaft, wherein
the upper shaft comprises two universal joints;
the lower shaft comprises two universal joints;
the upper shaft is positioned between and connected to each of the steering shaft and the input shaft;
the lower shaft is positioned between and connected to each of the output shaft and a pinion gear of the rack and pinion mechanism;
axes of the pinion gear of the rack and pinion mechanism and the output shaft are in different planes; and
axes of the steering shaft and the input shaft are in different planes.

10. The electric power assist module according to claim 1, wherein:

the torque sensor is for providing a signal that is indicative of torque applied to the input shaft;
the electronic control unit is for providing a pulse width modulation signal in response to at least the signal from the torque sensor; and
the motor is for driving the reduction gear assembly in response to at least the pulse width modulation signal.

11. The electric power assist module according to claim 1, wherein:
the pinion gear is connected to the drive shaft of the motor so that the pinion gear rotates with the drive shaft;
the pinion gear is meshed with a first gear of the intermediate gear;
the steering gear is meshed with a second gear of the intermediate gear;
the first gear of the intermediate gear is connected to the second gear of the intermediate gear so that the second gear of the intermediate gear rotates with the first gear of the intermediate gear;
the first gear of the intermediate gear has a helix angle;
the second gear of the intermediate gear has a helix angle; and
the steering gear is connected to the output shaft so that the output shaft rotates with the steering gear.

12. The electric power assist module according to claim 1, wherein:
the integrated housing defines a passageway between the electronic control unit and each of the torque sensor and the motor; and
both the first electrical connection and the second electrical connection extend through the passageway.

13. An electric power assist module for a steering system, with the electric power assist module comprising:
an integrated housing comprising an upper chamber and a side chamber that is beside and contiguous with the upper chamber, wherein the upper chamber includes an upper opening;
a torque sensor contained in the upper chamber;
a motor, wherein
the motor includes a body and a drive shaft that protrudes from the body,
the body includes a first portion,
the body includes a second portion, and
the second portion of the body of the motor is contained in the upper chamber so that the second portion of the body of the motor is adjacent to the torque sensor within the upper chamber;
an electronic control unit at least partially contained in the side chamber;
an input shaft;
an output shaft;
a torsion bar having opposite first and second ends, wherein the first end of the torsion bar is connected to the input shaft so that the first end of the torsion bar rotates with the input shaft, and the second end of the torsion bar is connected to the output shaft so that the second end of the torsion bar rotates with the output shaft;
an upper cover mounted to the integrated housing for closing the upper opening of the upper chamber, wherein the upper cover includes
a first opening, wherein the input shaft is rotatably mounted to the upper cover and extends through the first opening, and
a second opening, wherein the first portion of the body of the motor extends through the second opening;
a reduction gear assembly for transferring motion from the motor to the output shaft, wherein the reduction gear assembly comprises a helical gear train including a pinion gear, an intermediate gear and a steering gear; and
a lower housing that is mounted to the integrated housing, wherein
the lower housing at least partially contains the helical gear train, and
the output shaft is rotatably mounted to the lower housing and extends through an opening of the lower housing so that
the output shaft is aligned with the input shaft, and
the output shaft projects downwardly away from the lower housing.

14. The electric power assist module according to claim 13, wherein the integrated housing is formed as a single piece.

15. The electric power assist module according to claim 14, comprising
the integrated housing including a passageway that extends between, and extends to each of, the upper chamber and the side chamber;
a first electrical connection that extends from the electronic control unit to the torque sensor;
a second electrical connection that extends from the electronic control unit to the motor; and
each of the first electrical connection and the second electrical connection extending through the passageway of the integrated housing.

\* \* \* \* \*